(12) United States Patent
Beckmann

(10) Patent No.: US 6,521,167 B1
(45) Date of Patent: Feb. 18, 2003

(54) METHOD FOR PRODUCING COMPONENTS WITH SURFACE DECORATION

(75) Inventor: Friedhelm Beckmann, Hiddenhausen (DE)

(73) Assignee: Moeller Plast GmbH, Bielefeld (DE)

( * ) Notice: Subject to any disclaimer, the term of this patent is extended or adjusted under 35 U.S.C. 154(b) by 0 days.

(21) Appl. No.: 09/408,478

(22) Filed: Sep. 28, 1999

(30) Foreign Application Priority Data

Sep. 28, 1998 (DE) .......................... 198 44 632

(51) Int. Cl.⁷ ............................. B29C 49/22
(52) U.S. Cl. .............. 264/511; 264/514; 264/515; 264/516
(58) Field of Search ................ 264/511, 514, 264/515, 516

(56) References Cited

U.S. PATENT DOCUMENTS

| | | | | |
|---|---|---|---|---|
| 5,114,522 A | * | 5/1992 | Takado et al. | 156/245 |
| 5,194,305 A | * | 3/1993 | Shirahata et al. | 428/31 |
| 5,885,515 A | * | 3/1999 | Hudkins | 264/516 |
| 6,136,259 A | * | 10/2000 | Puffenberger et al. | 264/515 |

FOREIGN PATENT DOCUMENTS

| | | |
|---|---|---|
| DE | 1 729 540 | 6/1971 |
| DE | 2 110 631 | 9/1972 |
| DE | 26 49 526 | 5/1977 |
| DE | 197 06 849 A1 | 8/1998 |

OTHER PUBLICATIONS

Patent Abstracts of Japan No. 56–136332 A (Hideo et al.), dated Oct. 24, 1981.
Patent Abstracts of Japan No. 61–144328 A (Keizo), dated Jul. 2, 1986.
Patent Abstracts of Japan No. 62–255119 A (Keizo et al.), dated Nov. 6, 1987.
Patent Abstracts of Japan No. 02–179721 A (Toshiaki), dated Jul. 12, 1990.
Patent Abstracts of Japan No. 04–012824 A (Hidenori), dated Jan. 17, 1992.
Patent Abstracts of Japan No. 56–136333 A (Hideo et al.), dated Oct. 24, 1981.

* cited by examiner

Primary Examiner—Suzanne E. McDowell
(74) Attorney, Agent, or Firm—Laurence A. Greenberg; Werner H. Stemer; Ralph E. Locher

(57) ABSTRACT

A method of producing components with surface decoration, by which even difficult surface geometries can be produced with a satisfactory visible surface, includes prefabricating a sheet-like molding with a desired surface contour in a prior step. The prefabrication is carried out in a contour-defining preforming mold or in a contour-defining production mold. The prefabrication of the sheet-like molding may be carried out, for example, by spraying a material onto a surface of the separate contour-defining mold or of the production mold. The surface decoration may be coated on a rear side with a compact or expanded material and subsequently preformed.

12 Claims, 1 Drawing Sheet

METHOD FOR PRODUCING COMPONENTS WITH SURFACE DECORATION

BACKGROUND OF THE INVENTION

Field of the Invention

The invention relates to a method of producing components with surface decoration, in particular for use in the automobile industry, in which a sheet-like decorative material is fixed in a production mold and a plastic or synthetic-material tube is extruded, is closed at both ends after reaching a predetermined length and is inflated under positive pressure, causing it to come to bear against the decorative material and causing a composite component to be formed as a result.

The blow-molding method has been used for some time in the production of components with high-value surface decoration, due to the considerable possibility of integration of functional elements. The components that are produced can be used in various sectors, preferably in the automobile industry. In that method, firstly a sheet-like decorative material is held in the production mold by suitable fixing pins and a plastic or synthetic-material tube is subsequently extruded, closed at both ends after reaching a desired length and inflated under positive pressure.

That causes the still deformable plastic or synthetic material to come to bear against the decorative material. The composite is then stretched inside the production mold and thereby shaped to a contour predetermined by the production mold. The decorative material may in that case be formed, for example, of a textile, plastic or synthetic-material film, synthetic leather or genuine leather. There are limits to the deforming behavior due to the specific properties of those materials. That leads to weak points in the material or even to the decorative layer being torn. Therefore, difficult article geometries cannot be produced by that method, or great losses in quality have to be accepted. In addition, the strong deformation of decorative materials which have a surface texture leads to stretching, in which the surface texture is lost due to the effects of elongation.

SUMMARY OF THE INVENTION

It is accordingly an object of the invention to provide a method of producing components with surface decoration, which overcomes the hereinafore-mentioned disadvantages of the heretofore-known methods of this general type and with which even difficult surface geometries can be produced with a satisfactory visible surface.

With the foregoing and other objects in view there is provided, in accordance with the invention, a method of producing components with surface decoration, in particular for use in the automobile industry, which comprises prefabricating a decorative sheet-like molding with desired surface contours; subsequently fixing the decorative sheet-like molding in a production mold; extruding a synthetic-material tube, closed at both ends after reaching a predetermined length; and inflating the synthetic-material tube under positive pressure and causing the synthetic-material tube to come to bear against the decorative sheet-like molding to form a composite component.

Therefore, the object according to the invention is achieved by a sheet-like molding with the desired surface contours being prefabricated in a prior step.

In accordance with another mode of the invention, the prefabrication of the sheet-like molding is carried out in a separate contour-defining mold or in the contour-defining production mold.

In accordance with a further mode of the invention, the prefabrication of the sheet-like molding is carried out by spraying a material onto the surfaces of the separate contour-defining mold or of the production mold.

In accordance with again another mode of the invention, there is provided a method which comprises carrying out the step of prefabricating the decorative sheet-like molding by backing a decorative material with a material suitable for shaping.

In accordance with again a further mode of the invention, there is provided a method which comprises forming the backing from a material which can be made to expand by supplying energy.

In accordance with an added mode of the invention, the surface decoration is coated on the rear side with a compact or expanded material and subsequently preformed.

In accordance with an additional mode of the invention, the preformed sheet-like molding is placed into a contour-defining side of the production mold and fixed therein. In accordance with yet another mode of the invention, the fixing is performed by fixing pins or by vacuum.

In accordance with yet a further mode of the invention, for special cases, the rear side of the decorative material is coated with a compatibilizer. This compatibilizer is used for initially incompatible material combinations, so that a bond is ensured even in this case.

In accordance with yet an added mode of the invention, there is provided a method which comprises forming the decorative sheet-like molding from thermoplastic material, for example polypropylene, polyethylene, ABS, PC-ABS, polyamide or polyester.

In accordance with yet an additional mode of the invention, there is provided a method which comprises forming the decorative sheet-like molding as a film material expanded from thermoplastic.

In accordance with again an added mode of the invention, there is provided a method which comprises forming the decorative sheet-like molding as a film material having a combination of a thin, compact decorative layer and a foam backing.

In accordance with a concomitant mode of the invention, there is provided a method which comprises forming the film material from the group consisting of polyolefins, polyurethane, PVC and PVC/ABS.

Other features which are considered as characteristic for the invention are set forth in the appended claims.

Although the invention is illustrated and described herein as embodied in a method of producing components with surface decoration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
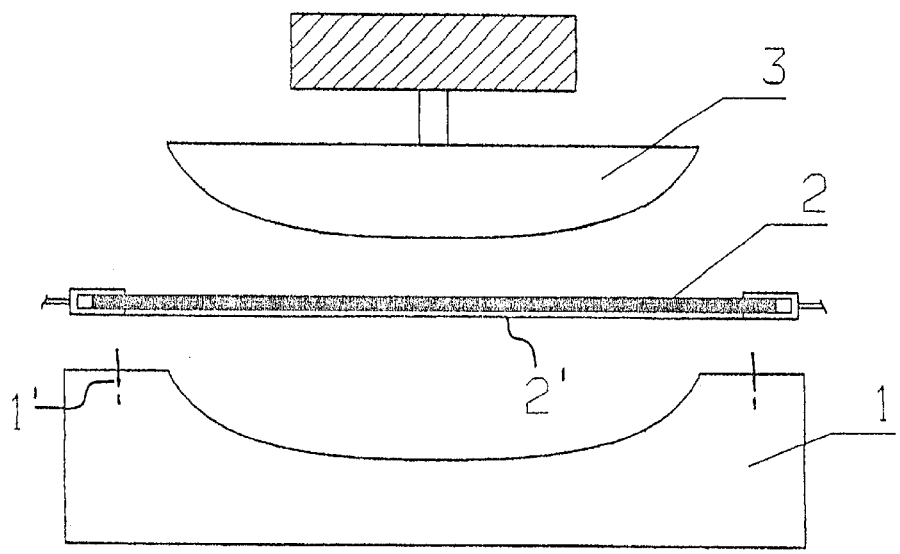
FIG. 1 is a diagrammatic, partly cross-sectional, exploded elevational view of a separate contour-defining mold in an opened state with a deformable decorative material.
Figure 2:
FIG. 2 is a cross-sectional view of a pre-deformed decorative material.

Referring now to the figures of the drawings in detail and first, particularly, to FIG. 1 thereof, there is seen a sheet-like deformable decorative material 2 which is placed in a separate contour-defining preforming mold 1 and preformed through the use of a preforming male mold 3 into a pre-deformed decorative material or molding 4 having a shape which can be seen in FIG. 2. The deformable decorative material 2 is held in the mold 1 by fixing pins 1' and/or by a vacuum. The deformable decorative material 2 may be formed from a thermoplastic material, such as polypropylene, polyethylene, ABS, PC-ABS, polyamide or polyester. The deformable decorative material 2 may also be a film material that is expanded from thermoplastic, is a combination of a thin, compact decorative layer and a foam backing or is formed of polyolefins, polyurethane, PVC or PVC/ABS.

The deformable decorative material 2 may be backed with a material 2' which is suitable for shaping. The material 2' may be made to expand by supplying energy. The material 2' may be a compact material and/or an expanded material coating a rear surface of the deformable decorative material 2 before preforming. The material 2' may also be a compatibilizer.

Figure 3:
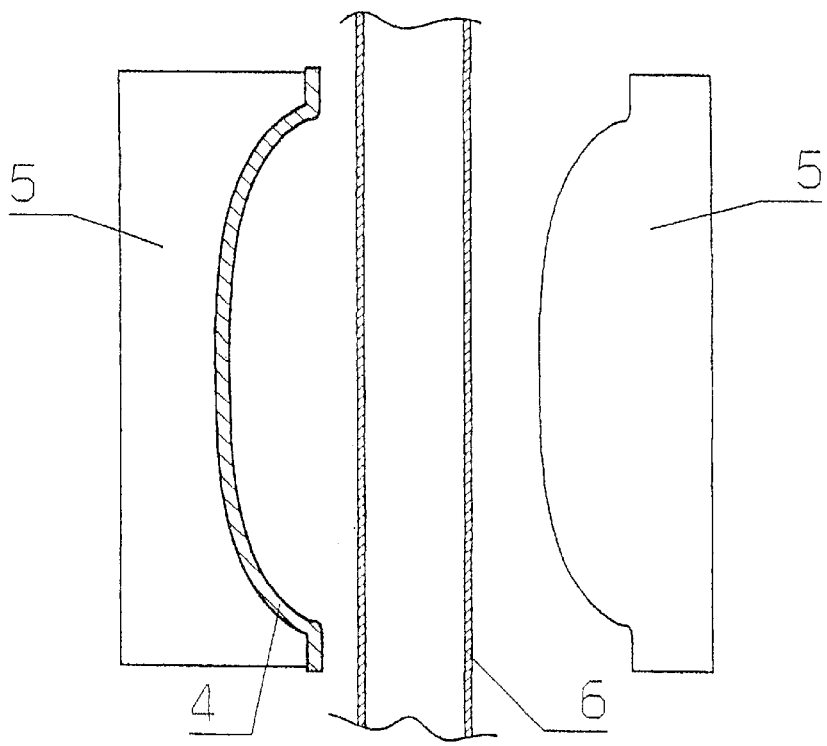
FIG. 3 is a fragmentary, partly cross-sectional, exploded elevational view of a contour-defining production mold with a prefabricated decorative material placed therein.

According to FIG. 3, the pre-deformed decorative sheet-like molding 4 is placed into a contour-defining production mold 5. However, the decorative sheet-like molding 4 may also be formed in the contour-defining production mold 5 in a prior step. An extruded synthetic-material blow-molding tube is denoted by reference numeral 6. The tube 6 has two non-illustrated closed ends and is inflated under positive pressure, causing the synthetic-material tube 6 to come to bear against the decorative sheet-like molding 4. Alternatively, the decorative sheet-like molding 4 may also be formed by spraying a material onto surfaces of the separate contour-defining preforming mold 1 or of the contour-defining production mold 5.

Figure 4:
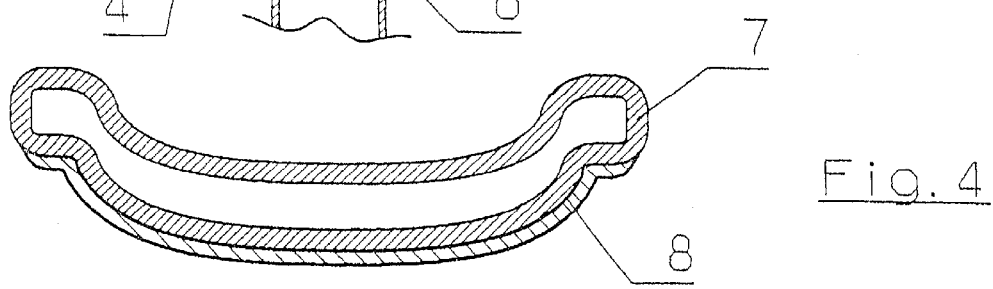
FIG. 4 is a cross-sectional view of a double-walled molding with decorative material blow-molded onto the back.

FIG. 4 shows a composite component 7, 8 including a double-walled hollow molding 7, produced by the blow-molding method, and a decorative material 8 blow-molded on the back.

I claim:

1. A method of producing components with surface decoration, which comprises:

prefabricating a decorative sheet-like molding with desired surface contours in a contour-defining production mold;

subsequently fixing the decorative sheet-like molding in the contour-defining production mold;

extruding a synthetic-material tube having closed ends and a predetermined length; and inflating the synthetic-material tube under positive pressure and causing the synthetic-material tube to come to bear against the decorative sheet-like molding to form a composite component.

2. The method according to claim 1, which comprises carrying out the step of prefabricating the decorative sheet-like molding by spraying a material onto surfaces of the production mold.

3. The method according to claim 1, which comprises carrying out the step of prefabricating the decorative sheet-like molding by backing a decorative material with a material suitable for shaping.

4. The method according to claim 3, which comprises forming the backing from a material which can be made to expand by supplying energy.

5. The method according to claim 1, which comprises carrying out the step of prefabricating the decorative sheet-like molding by coating a rear surface of a decoration with at least one of a compact material and an expanded material and subsequently preforming the decoration.

6. The method according to claim 1, which comprises carrying out the step of prefabricating the decorative sheet-like molding by coating a rear side of a decorative material with a compatibilizer.

7. The method according to claim 1, which comprises forming the decorative sheet-like molding from thermoplastic material.

8. The method according to claim 1, which comprises forming the decorative sheet-like molding from a material selected from the group consisting of polypropylene, polyethylene, ABS, PC-ABS, polyamide and polyester.

9. The method according to claim 1, which comprises forming the decorative sheet-like molding as a film material expanded from thermoplastic.

10. The method according to claim 9, which comprises forming the film material from the group consisting of polyolefins, polyurethane, PVC and PVC/ABS.

11. The method according to claim 1, which comprises forming the decorative sheet-like molding as a film material having a combination of a thin, compact decorative layer and a foam backing.

12. The method according to claim 11, which comprises forming the film material from the group consisting of polyolefins, polyurethane, PVC and PVC/ABS.

* * * * *